Sept. 1, 1970    F. H. MELLER ET AL    3,526,589

SOLIDS INTERCEPTION SYSTEM

Filed March 9, 1967    2 Sheets-Sheet 1

Inventors
Floyd H. Meller
Pei-Tai Pan and
Charles L. Swanson
By
Petherbridge, O'Neill and Aubel.
Attys.

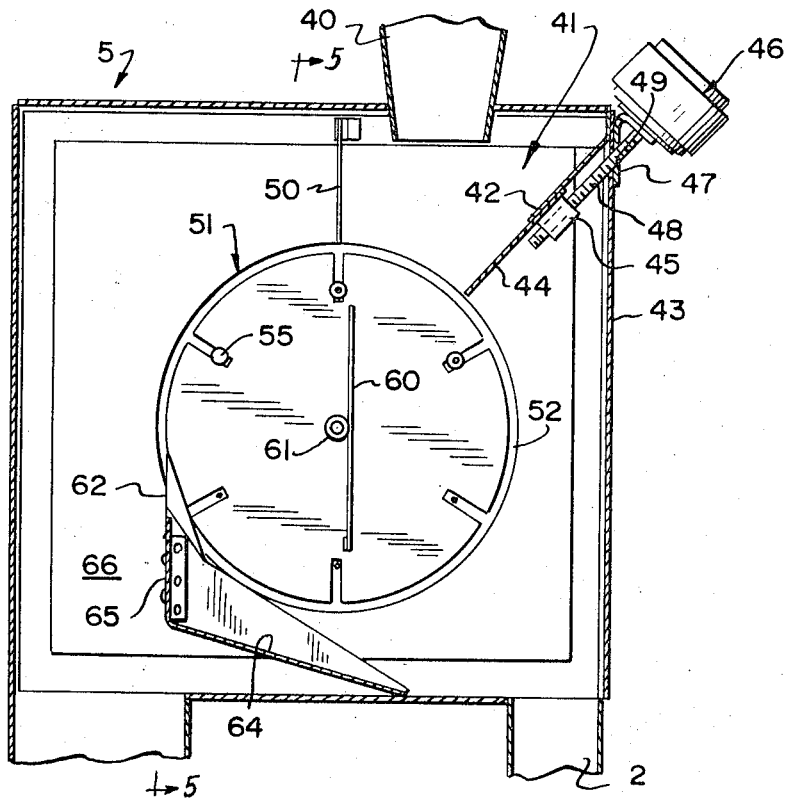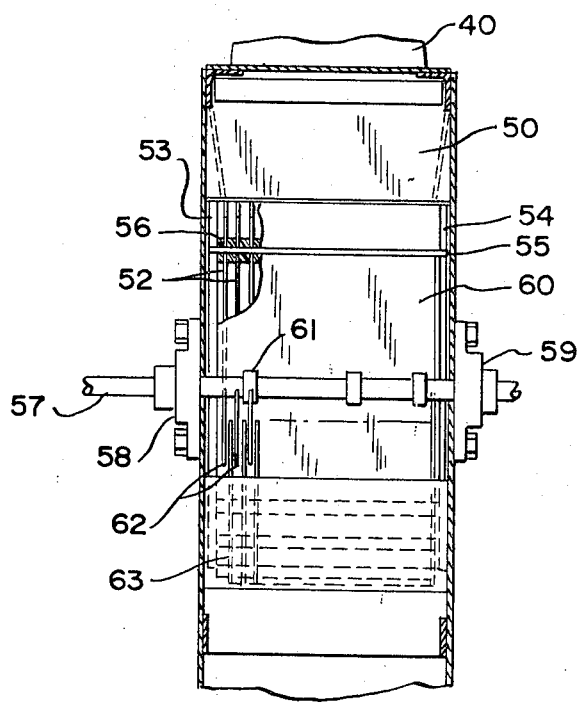

United States Patent Office 3,526,589
Patented Sept. 1, 1970

3,526,589
SOLIDS INTERCEPTION SYSTEM
Floyd H. Meller, Lexington, Mass., Pei-Tai Pan, Beloit, Wis., and Charles L. Swanson, Cincinnati, Ohio, assignors to Fairbanks Morse Inc., New York, N.Y., a corporation of Delaware
Continuation-in-part of application Ser. No. 535,474, Mar. 18, 1966. This application Mar. 9, 1967, Ser. No. 634,012
Int. Cl. B01d 33/04, 33/06
U.S. Cl. 210—77
9 Claims

ABSTRACT OF THE DISCLOSURE

An apparatus and system for separating solid material from a transporting fluid which is particularly useful in sewage treatment systems for separating solid and liquid fractions thereof. The system utilizes a separation apparatus which is positioned, in a sewage system, between the point of origin of the sewage and the point of final treatment of the sewage. The apparatus employed can be a rotatable endless belt or drum-type interceptor which is placed directly in the path of the solid-liquid mixture. The apparatus is designed to collect the solid fraction of the mixture while permitting the liquid fraction to flow from the apparatus. The belt or drum is rotated to provide continuous separation and to carry the intercepted solid fraction of the mixture from the intercepting zone to prevent solids breakup or excessive moisture accumulation. Ultimately, the collected solids are removed from the apparatus for final disposal.

---

This invention relates to a system for separating solid wastes from a transporting fluid prior to the dissolution or suspension of appreciable quantities of the solid matter in the fluid and is a continuation-in-part of our copending application Ser. No. 535,474, filed Mar. 18, 1966, for "Solids Interception System," now abandoned.

Generally, the first step in the treatment of municipal sewage at a treatment plant remote from the source of the sewage or solid waste matter is course screening to remove larger particles of the solid waste matter and to avoid the clogging and the damaging of the equipment. A secondary or fine screening has been previously used in place of sedimentation for removal of the fine suspended material. The use of fine screening techniques in municipal sewage treatment plants, however, has largely been abandoned due to the poor performance and high maintenance requirements of the screening devices. The advantages of fine screening, therefore, have never been fully realized primarily due to the fact that these techniques have been applied at points which are remote from the point of deposition of the solid waste matter in the liquid transporting medium. Recent practice has tended to limit the use of fine screening to treatment requiring less than a 10% removal of suspended solids.

Since sewage treatment plants are often miles from the source of the solid waste matter, the physical characteristics of the sewage or solid waste matter when it reaches the plant are considerably different from those in the fresh state. The dissolution, suspension, disintegration and decomposition of the solids are primary factors producing the physical difference at the treatment plant. Further, generally velocities of the liquid transporting medium of the solid waste matter are seldom sufficient to prevent deposition of the solids in sewers with a resulting decomposition and liquefaction of such solid portions. Pumping is generally required at a sewage treatment plant to elevate the sewage to ground level treatment units resulting in additional solids disintegration.

It has been found that in order for screening or filtering to be an effective means for sewage treatment, the solid fraction of the solid-liquid sewage mixture or combination must be intercepted at or near the point at which the solid matter is deposited into the liquid transporting medium. The preferred system of the invention provides a means for intercepting the solid fraction of a solid-liquid waste matter mixture and for separating the solid and liquid fractions of the mixture while the solid fraction is in an essentially unchanged fresh state. By intercepting and separating the solid waste matter near its place of deposition into a liquid transporting medium, the solid matter can be removed from the transporting liquid before any appreciable portion of it has become dissolved, suspended, disintegrated or decomposed and thereby not easily separated from the transporting liquid.

The system of the invention thereby provides simple and efficient means for removing solid waste matter from its liquid carrier in an essentially unchanged condition between its point of deposition into the liquid carrier and the point of ultimate treatment of the liquid carrier. This results in the minimization of the production and loss of fine solids. Large particles are rapidly removed thereby minimizing maintenance problems of any subsequent treatment facilities. The rapid removal of the solids from the transporting liquid prevents any appreciable breakup, dissolution or suspension of the solids carried by the liquid. Since the solids, according to the system of the invention are removed early, decomposition and liquefaction of the solid waste matter in sewer lines can be averted. And, the system provides a means for utilizing small and compact treatment units near the point of deposition of the solids into the liquid medium and remote from commonly used sewage treatment plants.

It has been found that solids once separated from the liquid transporting medium can be quite economically disposed of by incineration methods. Due to early interception and separation, the system of the invention provides an efficient means for substantially reducing the moisture content of the solid fraction of the solid-liquid mixture. This early interception and moisture reduction therefore can significantly reduce the fuel requirement involved in substantially incinerating the solid matter collected. Further, the early removal of the solid waste fraction from the solid-liquid mixture can increase the capacity of municipal treatment systems. The early and substantial solid waste matter removal of the invention can also reduce or eliminate sludge handling which is presently required at remote treatment plants.

Since the presence of dissolved and suspended waste matter solids in the liquid transporting medium is significantly reduced by the system of the invention, the need for the following treatments at remote treatment plants is substantially reduced or eliminated: coagulation or disinfection; aerobic treatments such as trickling filters, oxidation ponds, and activated sludge processes including package sewage treatment plants; anaerobic treatments such as septic tanks and digesters; tertiary sewage treatments such as phosphate and other inorganic contaminant removal; sludge handling such as sludge drying beds; and vacuum filtering or centrifuging. The improvement in the effluent or liquid transporting medium quality subsequent to solid waste matter removal therefore produces substantial economies in the consequent treatment of sewage at remote treatment plants.

The system of the invention could reduce costs in the areas of subsequent effluent treatment, as described above, a reduction in capital equipment required in municipal treatment plants, the possible elimination of separate storm and sanitary sewers, and a reduction in the cost of the purification of water for subsequent reuse.

The simplicity of the system of the invention and of apparatus used to carry it out will permit its utilization in areas which were not previously covered by treatment systems, such as: marine applications, portable treatment systems, improved domestic systems, and remote industrial, commercial and public facilities.

The preferred system of the invention utilizes an apparatus which is designed to be positioned near the point at which the solid waste matter is deposited into the transporting liquid medium to realize the benefits of early interception. The apparatus is designed to intercept the solid fraction of the solid-liquid mixture and to separate the fractions, removing the solid watste matter collected from the intercepting of impact zone to a collecting zone. The collecting zone is so arranged that subsequent treatment such as incineration could be accomplished either at the collection zone or at a remote point.

In the operation of the preferred apparatus of the system of the invention, raw sewage carried by water is discharged from a depositing receptacle into a drain conduit. The drain conduit is in communication with a housing containing a rotatable drum type interceptor or separator and discharges the sewage and water onto the drum. In some applications the drum can be continuously driven. In other applications the drum may be intermittently driven being actuable prior to contact with the sewage-water combination or upon contact of the combination with the drum. The drum is positioned with respect to the drain conduit in a manner such that solids deposited thereon are quickly moved away from the set impact zone allowing liquid gravity drainage from the drum to minimize liquid carry-over into a solids collecting tray located adjacent the drum.

It has been found that higher solids removal efficiencies can be produced by higher drum speeds. Fast drum speeds carry the solid material retained thereon from the solid-fluid impact zone more quickly and thereby reduce solids break-up caused by turbulence and the impacting of the solid-liquid mixture emanating from the drain conduit.

The solid waste matter on the drum is partially removed therefrom by gravitation and finger scrapers may be employed which act to dislodge retained solids from the drum and to deposit them in the solids collection tray. Since the drum is generally of a cylindrical design, it continues to travel through the solid-liquid influent impingement zone but opposite its solids receiving position. The liquid fraction of the solid-liquid waste matter mixture, which flows through the moving screen by gravity, cleanses particles retained on the drum after the scraping step and leaves the housing by an effluent pipe which is located near the bottom of the housing.

It has also been found to be desirable to eliminate means in the housing that might result in the pooling of liquid at the point of impact of the solid-liquid mixture with the moving drum. If such pooling should occur in the impact zone, it is possible that a substantial amount of solids dissolution or suspension could occur with a resulting decrease in efficiency of the system of the invention.

An embodiment of an apparatus which may be employed in the performance of the process of the invention consists of a movable screen belt interceptor or separator which is positioned in a housing to receive the sewage being discharged from a drain conduit. The interception screen belt, e.g., can be continuously or intermittently driven and can be operated at various speeds.

The intercepting or separating screen belt is inclined from the horizontal in a manner such that sewage discharged thereon is quickly carried upwardly and out of the sewage impact zone. This permits gravitational drainage from the retained solids and reduces liquid carry-over into the solids collecting device which is positioned in solids receiving relationship with the apex of the belt. The bulk of the solid waste matter is removed from the belt by gravitation while the remainder is removed by a belt scraper. The draining liquid fraction also exerts a belt cleansing effect as it passes from the belt and into the effluent pipe.

Various other objects and advantages of the invention will herinafter become more fully apparent from the following description of the drawings illustrating presently preferred embodiments thereof and wherein:

FIG. 4 is a side elevational view of the preferred intercepting apparatus of the invention; and FIG. 5 is a view of the preferred intercepting apparatus of the invention of FIG. 4 taken along lines 5—5 thereof.

Figure 1:
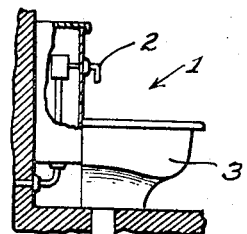
FIG. 1 is a side elevation of an apparatus comprising the system of the invention.

Referring to the drawings, FIG. 1 illustrates a water closet generally designated 1 of a common variety well known in the art. The water closet includes a conventional flushing valve 2 and a water-chargeable waste receptacle 3. The waste receptacle 3 communicates in the usual manner with a drain or discharge pipe 4. This pipe serves to carry waste matter and water from the receptacle 3 of the water closet to a solids intercepting and separating apparatus generally designated 5.

Figure 2:
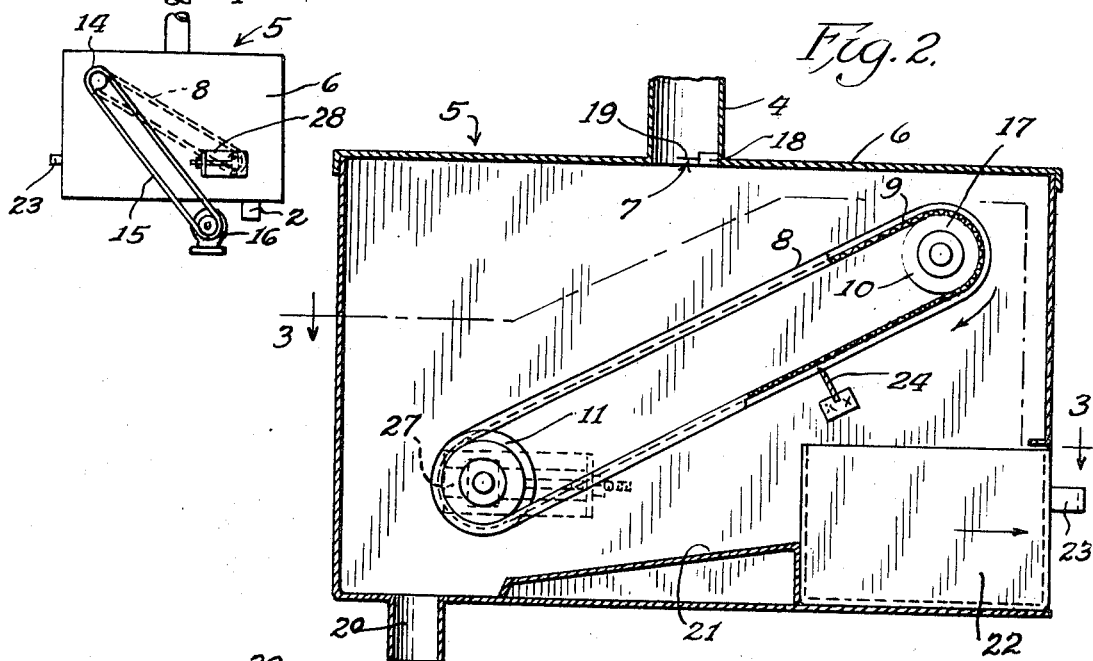
FIG. 2 is a cross-sectional view of an intercepting apparatus of the invention.

As is shown in FIG. 2, discharge pipe 4 opens into the housing 6 of the intercepting apparatus at 7. It is preferable, where convenient, to position the solid intercepting and separating apparatus 5 as close to the water closet or point of deposit of the waste material as is feasible to maximize early solids interception and to thereby minimize solids breakup. The system illustrated in FIG. 1 is typical of that which may be utilized in the average residence. However, in installations such as in large apartment and office buildings, manufacturing plants or schools, one large central intercepting and separating unit connected in operative relationship with respect to all of the waste disposal elements of the building may be employed to take care of the needs of the entire installation, or several units of intermediate size may be employed. In larger installations utilizing one large unit or several units of intermediate size, it is not possible to locate such intercepting and separating units close to each source of waste matter deposit in the installation and therefore for practical considerations the units are necessarily spaced from a number of such sources.

Figure 3:
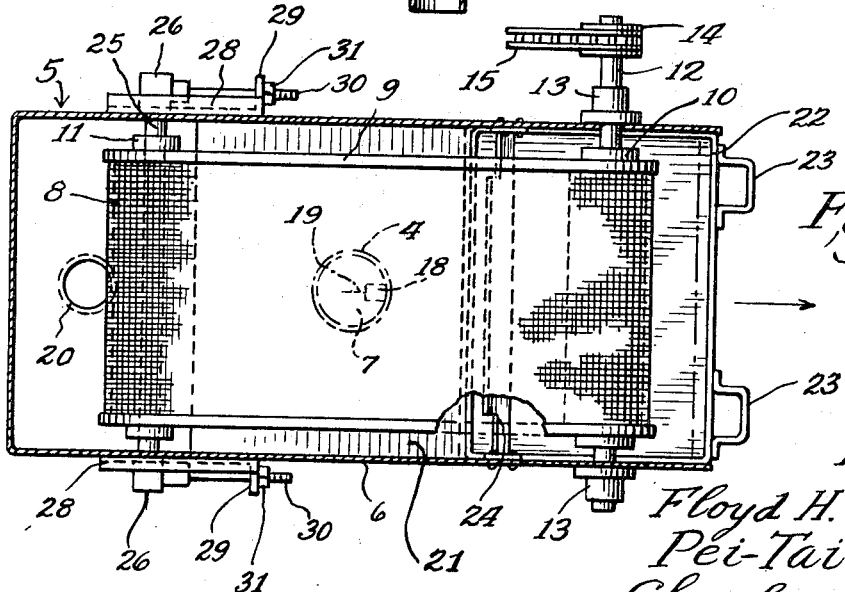
FIG. 3 is a sectional view of the apparatus of FIG. 2 taken on line 3—3 of FIG. 2.

Referring particularly to the intercepting and separating apparatus 5 shown in conjunction with the water closet 1 of FIG. 1, water and waste matter are discharged from the receptacle 3 through drain pipe 4 into the housing 6 through the outlet 7. The liquid and solid waste mixture discharged through outlet 7 gravitates onto a fine screen interceptor or separator belt 8, which can be fabricated in the form of fine mesh metal, monofilament saran screens, etc. The screen 8 is endless and is connected to a pair of endless spaced belts 9, as are best seen in FIG. 3. The endless screen and belt combination 8 and 9 is rotatably driven around a metal drum or cylinder 10 and an idler drum or cylinder 11. Cylinder 11 is positioned at a point spaced laterally from and below cylinder 10. The belts 9, which carry interceptor belt 8, can be of the toothed timing belt variety shown in FIG. 2 or any other suitable type of drive belt.

Cylinders 10 and 11 are aligned in generally axial parallel relationship across housing 6, as shown in FIG. 3, but with the cylinder 10 being in a slightly elevated relationship with respect to cylinder 11 as shown in FIG. 2. The transverse section of interceptor belt 8 extends almost entirely across the breadth of housing 6. And, as is shown in FIG. 3 the sewage discharge outlet 7 is positioned directly above and centered over the interceptor belt 8.

As is shown most clearly in FIGS. 1 and 3, cylinder 10 includes a shaft 12 which is supported on housing 6 by bearings 13. One end of shaft 12, as shown in FIG. 3 projects from the bearing and carries a sprocket 14. The sprocket 14 is driven by a chain 15, best seen in FIG. 1, which extends to and is driven by a motor 16. As cylinder 10 is rotated by driven sprocket 14, sprockets 17, shown in FIG. 2, spaced on opposite ends of cylinder 10, in turn, drive the belts 9 and thereby the fine interceptor belt 8 connected to them.

In installations where the discharge of waste matter is substantially continuous, the interceptor or separator belt will ordinarily be continuously driven. However, in applications wherein the apparatus of the system of the invention is required only intermittently, the belt 8 may be driven only at times when waste matter is actually being discharged upon the belt. To accommodate such situations, a pressure sensitive switch 18, which is operated by a pressure actuated lever 19, is positioned in the housing with lever 19 overlying the opening of pipe 4. Switch 18 is connected to motor 16 in the conventional manner. The lever 19 of the switch is responsive to the pressure of the liquid being discharged from the pipe 4. The lever initiates the operation of motor 16 through the actuation of switch 18 and thereby the drive of the belt 8 in the presence of liquid in the housing. When the liquid has been discharged from the pipe 4 through effluent pipe 20, lever 19 acts to open the switch and thereby inactivates the motor 16.

While a pressure sensitive switch is shown in FIG. 2, it is realized that any of the number of commonly available switch mechanisms could be employed in conjunction with the intercepting and separating apparatus 5 to initiate the operation of motor 16. Such operation can be initiated either prior to the discharge of wastes into the housing by connecting the switch between the actuator of flushing valve 2 and the motor 16; upon impact with the interceptor belt 8 by a switch installed in the housing 6 and actuated by the deflection of interceptor belt 8 by impact and mass weight thereupon; upon entry into the housing and prior to impact with interceptor belt 8 by a switch connected near the housing opening 7 and actuated by the passage of a mass through the opening 7; at preselected intervals by a suitable timer actuated switch; or combinations of the above.

As the initial portions of solid waste matter and its transporting medium, in this instance water, descends onto the belt 8 beneath the outlet 7, rapid rotation of belts 8 and 9 will set to remove the solid fraction of the initial portion of the descending mixture from the impact zone quickly and with a minimum of solids disintegration or breakup caused by the following portions of the descending mass. As belt 8 carries the solid fraction of the mixture upwardly and away from the impact zone, the liquid fraction of the mixture drains through the belt in a generally downward direction through the moving belt and into contact with the lower portion of the belt. This serves to wash retained solid fraction residue from the bottom portion of the belt as it returns through the impact zone and thereby inhibits interceptor belt clogging. The liquid fraction then descends onto the contoured floor 21 of the housing which is designed to quickly empty the liquid or effluent fraction through effluent pipe 20. When the effluent has passed from the housing 6, as mentioned above, the motor control switch 18 is opened by the action of float 19 and the operation of the apparatus is halted.

The solid fraction of the waste matter retained by the belt is carried upwardly and partially around cylinder 10 where it gravitates, falling into a collection tray 22. The collection tray 22 is positioned in the base of housing 6 but is spaced from the normal path of the fluid fraction flow from pipe 4 through the screen belt 8 and into effluent pipe 20.

As is shown in the drawings, collecting tray 22 is provided with handles 23 which will permit the manual or mechanical withdrawal of the tray from the unit for disposal of the accumulated solid fraction at another point. In large installations, however, the collection tray can be replaced by an incineration unit (not shown) whereby the solid matter as it is deposited in the collection tray can be incinerated and immediately disposed of at the collection point.

FIGS. 2 and 3 illustrate a scraping device 24 which spans the underside of interceptor screen belt 8 across housing 6 and is positioned in contact with it. This scraper 24 acts to remove solid matter retained on the moving belt and to deflect it into the collecting tray prior to its passage through the liquid exposure and washing zone. This serves to minimize the amount of retained solids which are washed from the belt by liquid effluent.

Since, during periods of prolonged use, belts 8 and 9 may become stretched and may no longer be efficiently driven over cylinders 10 and 11, the shaft 25 projecting from idler cylinder 11 is carried by adjustable bearings 26 movably mounted on housing 6. Shaft 25 projects through a slot 27 in the housing 6 and into bearings 26. The bearings are connected to plates 28, one of which is mounted on each side of the housing. Bearings 26 are moveable with respect to plates 28 in a horizontal direction. Plates 28 are formed with flanges 29 on one of their ends. Bolts 30 extend horizontally through the flanges and are secured to bearings 26. The tension of the shaft 25 and thereby idler cylinder 11 and belts 8 and 9 is adjusted by means of nuts 31 positioned on the side of the flanges 29 opposite the bearings. By rotation of nuts 31, bolts 30 are selectively moved inwardly or outwardly with respect to the ends of the housing 6. As shown in FIGS. 2 and 3, the movement of the bolts together or individually from right to left will selectively increase the tension of the belts and the movement of the bolts from left to right will selectively decrease the belt tension.

In operation of the apparatus, solid waste matter is deposited into the receptacle 3 of water closet 1. Valve 2 is actuated and serves to discharge the waste matter from the receptacle into the drain pipe 4. The solid-liquid waste matter mixture passes through drain pipe 4 and out of outlet 7 where it gravitates onto the belt 8 and which, in this instance, begins to rotate as soon as switch 18 is closed by lever 19 and continues to rotate until switch 18 is opened. The liquid fraction of the waste matter mixture begins to drain through the belt as the solid fraction is carried upwardly and away from the impact zone of the solid-liquid waste matter mixture upon the belt. As the solid fraction of the waste matter reaches the apex of the cylinder 10, it begins to gravitate and falls into the waste collecting tray 22. Any residue clinging to the belt is removed therefrom by scraper 24 and is deflected into the collecting tray 22. The screen interceptor belt 8 after passing the scraper 24 is carried through the liquid fraction drainage zone and is cleansed of any clinging solid residue by the liquid effluent. Finally, after the liquid fraction has been discharged from housing 5 effluent pipe 20, switch 18 is opened thereby halting operation of the unit until the initiation of another cycle.

Best results have been obtained with the system of the invention where the interceptor belt has been moved at a speed which carried impacting solid material out of the impacting zone as quickly as possible but at a speed slow enough to prevent the carry-over of substantial moisture on the belt into draining relationship with respect to the collecting tray 22. This speed varies appreciably with the mesh size of the screen interceptor belt, the angle of incline of the belt and the diameters of the influent and effluent connections of the housing. To provide for maximum operating efficiency, it has been found to be desirable to reduce the moisture content of the solid fraction of the waste matter to its lowest possible level to provide for the more efficient incineration or subsequent treatment of the waste matter collected in tray 22.

Therefore, by interposing a solid waste matter intercepting and separating apparatus in the sewage line between the point of deposition of the solid waste matter into a liquid transporting medium and the site of final processing of the waste matter, and preferably as close to the point of deposition of the waste matter into the liquid transporting medium, substantial efficiencies and economies in waste removal and treatment can be realized.

A second and preferred embodiment of an apparatus of the invention for performing the process of the invention is illustrated in FIGS. 4 and 5. The portions of this embodiment which correspond to those of FIGS. 1, 2 and 3 will be referred to by like reference characters.

As is shown in FIG. 4, the discharge pipe 4 from water closet 1 is connected at its lowermost portion to an inlet transition conduit 40. The inlet transition conduit 40 opens into the housing 6 of the intercepting and separating apparatus. This conduit is designed to permit the expansion and reduction of velocity of the solid-liquid mixture passing through discharge pipe 4 to produce the distribution of the descending mixture over a broader impacting and intercepting area of the interceptor apparatus.

An inclined waste deflecting inlet baffle generally designated 41 spans the width of housing 6 and has a first portion 42 secured to an end wall 43 of the housing and secured between opposite side walls of the housing in flow directing relationship with respect to the inlet transition conduit. Inlet baffle 41 has a second movable portion 44 positioned beneath the first portion of baffle 42. A block 45 having an axially threaded bore is connected to the underside of baffle portion 44. A motor 46 rotatable in both forward and backward directions is secured to wall 43 of the housing 6 by a bracket 47. The motor shaft 48 is threaded and projects through an opening 49 in wall 43 and is threaded into the opening of block 45. Actuation of the motor 46 in one direction will thereby cause the block 45 and attached second baffle portion 44 to move toward wall 43 while actuation in the other direction will cause the elements to move in the opposite direction. A flexible splash control flap 50 also spans the width of housing 6 and is connected to the top portion of housing 6 in spaced generally parallel relationship with respect to the inlet baffle 41. The baffle 50 depends from the top of housing 6 and into contact with a disc drum interceptor generally designated 51 and acts in conjunction with the baffle 41 as a waste directing device and to prevent liquid carry-over into the solids collecting chamber of the housing located opposite the inlet chamber.

The disc dum interceptor 51 consists of a plurality of parallel and axially aligned discs 52 which are connected to end plates 53 and 54, as is best seen in FIG. 5, by rods 55. The discs 52 are maintained in spaced parallel relationship by a plurality of spaced elements 56 spaced by connecting rods 55. The end plates 53 and 54 are secured to a drive shaft 57 which is journaled on opposite sides of housing 6 in bearings 58 and 59. One end of drive shaft 57 is connected to the drive shaft of a rotary drive motor (not shown), a conventional motor for producing controlled rotary motion. The motor is designed to rotate the disc drum at a predetermined speed. The criterion for establishing the predetermined speed in this embodiment is similar to that utilized in the embodiments of FIGS. 1, 2 and 3.

As can best be seen in FIG. 4, an elongate generally vertically extending baffle 60 is utilized to deflect liquid flow from the solids separation zone and to prevent liquid from splashing into the solids collection receptacle. The baffle 60 is connected to the drive shaft 57 by loosely fitting rings 61, and the baffle is weighted to remain in a generally vertically fixed position as shaft 57 rotates.

During a waste discharge onto the drum interceptor 51, which is positioned beneath the inlet transition conduit 40 between the inlet baffle 41 and the splash control flap 50, and has its axis positioned in generally parallel alignment with the longitudinal axes of these elements, as is shown in FIG. 5, a high rate of disc speed is desired. A major limiting factor in relation to disc drum speed lies in the carry-over of liquid beyond the splash control flap 50 into the separation chamber of the housing 6 which undesirably increases the moisture content of the collected and separated solid fraction. It has been found in some applications that this internal baffle 60 can aid in preventing liquid splash and carry-over. In applications utilizing the internal baffle 60, the splash control flap 50 has been found to coact with the inlet baffle 41, the inlet transition conduit 40, the drum interceptor 51 and internal baffle 60 and permits the utilization of higher interceptor speeds than would be ordinarily possible in such applications using the belt drive system shown in FIGS. 1, 2 and 3 by diminishing liquid carry-over at higher operating speeds.

As can be seen in FIGS. 4 and 5, a plurality of finger scrapers 62 are positioned in the housing 6 in parallel spaced alignment and in alignment with spaces 63 provided between the discs 52 of disc drum 51. FIG. 5 illustrates the positioning of the finger scrapers with one being positioned between each pair of discs 52. This positioning can be varied, e.g., one finger between every other pair of discs 52, with good results still being obtainable. As can be seen in FIG. 4, an angular projecting edge of each of the scrapers extends a distance into each of the spaces 63 formed by pairs of discs 52. The scrapers are thereby enabled to dislodge any solid particles which may adhere to and be retained by the drum interceptor 51. In this instance, the inclined floor 64 is provided with a flange 65 which extends across the housing in parallel alignment with the axis of drum 51 and serves as a base for anchoring the finger scrapers 62 which are secured to the flange by suitable means (not shown). The inclined floor 64, as in the case of the embodiment of FIGS. 1, 2 and 3 is positioned in the housing to direct lquid downwardly to effluent pipe 20 from whence the liquid fraction is discharged from the housing 6.

A solids receptacle similar to the collecting tray 22 of the apparatus of the first embodiment is normally positioned in the solids collecting chamber 66 of drum interceptor 51 in an area of the chamber generally diagonally opposite the opening of inlet transition conduit 40 into the housing 6. While such a receptacle can be removable from time to time to discharge the contents thereof, it is understood that in certain applications, an incineration device or other suitable on-the-spot disintegrator can be used to dispose of the solids collected in the receptacle.

In operation, a solid-liquid mixture is discharged from a receptacle, such as 3 in FIG. 1, through a discharge pipe 4 and into inlet transition conduit 40 where the mixture, which is initially constricted in the pipe 4, is permitted to expand across substantially the entire breadth of the housing 6 as it enters the housing of the intercepting and separating apparatus. The disc drum 51 can be actuated by the switch and lever arrangement 18 and 19 employed with respect to the embodiment of FIGS. 1, 2 and 3 or can be actuated by any of the alternate devices suggested with respect thereto. As the gravitating solid-liquid mixture enters the housing through transition conduit 40, its velocity is reduced and its flow is expanded across the axis of drum 51. It is guided into impacting relationship with respect to the disc drum interceptor 51, which is rotating at a predetermined speed, by inlet baffle 41 and splash control flap 50.

As the disc drum 51, which is being rotated in a counter-clockwise direction, intercepts the descending mixture, the liquid fraction thereof is drained from between the spaced discs 52 downwardly and outwardly of baffle 60 onto the inclined floor 64, positioned beneath the drum interceptor 51, where it is directed into the effluent pipe and is discharged from the housing to a remote point of disposal. As the liquid is being drained from the drum, the solid fraction which is retained on the discs of the drum is carried through flexible flap 50 and into the separating chamber 66 where the bulk of the solid material freely falls from the rotating drum interceptor 51 into a solids receptacle. The solid material which adheres to a portion of the drum is dislodged therefrom and deflected into the solids receptacle by the finger scrapers 62, as that portion of the drum descends in an arc through chamber 66 and prior to its exit therefrom. Following scraping, the scraped drum portion is in condition for recycling through the waste mixture impingement or impact zone on the opposite side of baffle 60.

The reversible motor control of portion 44 of inlet baffle 41 is provided as a precautionary measure. In the event of the failure of the operation disc drum interceptor 51, a substantial solids accumulation would generally develop in the area above interceptor 51 and between splash control flap 50 and baffle 41. It is possible that such an occurrence could result in the backup of the sewage discharge system. Therefore, motor 46 may be manually actuated to open baffle 41 by retracting movable portion 44 under stationary portion 42 and to permit passage of both the solid and liquid portions to pass through the interceptor housing. In remote installations of the interceptor, motor 46 may be actuated through a circuit (not shown) connected with the drum interceptor 51 which would actuate the motor 46 upon nonoperation of the interceptor.

Therefore, by interposing a solid waste matter intercepting and separating apparatus in the sewage line between the point of deposition of the solid waste matter into a liquid transporting medium and the site of final processing of the waste matter, and preferably as close to the point of deposition of the waste matter into the liquid transporting medium, substantial efficiencies and economies in waste removal and treatment can be realized.

Various modes of carrying out the invention are contemplated as being within the scope of the following claims particularly pointing out and distinctly claiming the subject matter which is regarded as the invention.

We claim:

1. A sewage separation system for separating solid and liquid fractions of a solid-liquid sewage mixture adjacent the point of origin of the mixture comprising a source of origin of a solid-liquid sewage mixture wherein solid sewage fractions and liquid sewage fractions are mixed together, a solid-liquid sewage mixture carrying conduit extending from said source of origin of said mixture and having an inlet for receiving the sewage mixture therein and having an outlet spaced a short distance from said inlet, movable interceptor means disposed in fluid communication with said conduit immediately adjacent said outlet thereof and proximate said source of origin of said mixture for intercepting and separating substantially all of the solid fractions from said liquid fractions of the mixture before substantial dissolution or disintegration of solid fractions in the liquid fractions occurs, solid fractions receiving means disposed adjacent said interceptor means for receiving the separated solid fractions from said interceptor means separately from liquid fractions, and means for carrying liquid fractions away from the area of said interceptor means separately from the solid fractions, said interceptor means being constructed and arranged to intercept and separate the solid fractions and to transport the same to said solid fractions receiving means.

2. The sewage separation system as set forth in claim 1 wherein said means for intercepting and separating the solid-liquid sewage mixture comprises a movable interceptor member disposed in fluid communication with said solid-liquid sewage mixture conduit whereby the sewage mixture flowing in said conduit is intercepted by said movable interceptor member and separated into the solid and liquid fractions thereof respectively, by the movement of said member.

3. The sewage separation system as set forth in claim 1 wherein said movable interceptor means includes drainage means for passage of liquid fractions therethrough.

4. The sewage separation system as set forth in claim 2 wherein said movable interceptor member comprises a rotatable drum having a plurality of axially aligned and spaced discs for intercepting and restraining the solid fraction of the sewage mixture while the liquid fraction is permitted to pass between said discs.

5. The sewage separation system as set forth in claim 2 wherein said movable interceptor member comprises a movable belt member, said belt member being endless and inclined with respect to the horizontal whereby the solid-liquid sewage mixture strikes said belt member permitting the fluid fraction to flow down the inclined belt while the solid fraction is restrained and carried upwardly by the movement of the belt.

6. The sewage separation system as set forth in claim 1 including a housing having an inlet port connected to the outlet of said conduit and having said movable interceptor means disposed therein immediately below said inlet port of said housing, said housing being further provided with a baffle disposed adjacent said inlet port thereof for distributing the sewage mixture across the breadth of said interceptor member to enhance separation of said solid fractions from said liquid fractions and an outlet port disposed in said housing spaced from said inlet port for receiving the separated liquid fractions and disposing of the separated liquid fraction separately from the solid fractions.

7. The sewage separation system as set forth in claim 6 wherein said housing is further provided with a splash control flap disposed adjacent said interceptor means along the line of movement thereof and spaced from said baffle for enhancing the separation of the solid and liquid fractions of the sewage mixture.

8. A process for separating solid and liquid fractions of a solid-liquid sewage mixture adjacent the point of origin of the mixture comprising the steps mixing solid sewage fractions and liquid sewage fractions at a source of origin of a solid-liquid sewage mixture, transporting the solid-liquid sewage mixture in a conduit away from said source of origin, providing movable interceptor means in fluid communication with said conduit and disposed contiguous to said source of origin of the solid-liquid sewage mixture, intercepting the solid-liquid sewage mixture with said movable inceptor means, separating substantially all of the solid fractions from the liquid fractions of the mixture before substantial dissolution or disintegration of the solid fractions of the mixture occurs, removing the separated solid fractions by the movement of the interceptor means, disposing of the separated solid fractions separately from the liquid fractions, and removing and disposing of the liquid fractions separately from the solid fractions, whereby the solid fractions of a solid-liquid sewage mixture are intercepted, separated and disposed of separately from the liquid fractions thereof at a point contiguous to the source of origin thereof prior to substantial dissolution or distintegration of the solid fractions of the mixture occurs, while the liquid fractions are separated and disposed of separately from the solid fractions of the mixture.

9. A sewage separation system for separating solid and liquid fractions of a solid-liquid sewage mixture adjacent the point of origin of the mixture comprising: a chamber for originating a solid liquid sewage mixture wherein solid sewage fractions and liquid sewage fractions are mixed together, conduit means extending from said chamber and having an inlet for receiving the sewage mixture and having an outlet spaced adjacent said inlet, a housing having an inlet port in fluid flow communication with said outlet of said conduit means, movable interceptor means disposed in said housing below said inlet port of the housing, baffle means disposed in the housing adjacent said inlet port thereof for distributing said sewage mixture in said housing to enhance separation of said solid fractions from said liquid fractions, splash control flap means disposed in said housing adjacent said interceptor means along the line of movement thereof and spaced from said baffle means for enhancing the separation of the solid and liquid fractions of the sewage mixture, said interceptor means being in fluid communication with said conduit means immediately adjacent said inlet thereof and proximate said chamber for intercepting and separating substantially all of the solid fractions from said liquid fractions of the mixture before substantial dissolution or disintegration of solid fractions in the liquid fractions occurs, an outlet in said housing for removal of separated solid fractions, means disposed adjacent said interceptor means outlet for receiving said separated solid fractions from said liquid fractions, and an outlet port in said housing spaced from said inlet port of said housing for receiving the separated liquid fractions separately from the separated solid fractions.

References Cited

UNITED STATES PATENTS

| | | | |
|---|---|---|---|
| 864,828 | 9/1907 | Callow | 210—400 X |
| 1,303,358 | 5/1919 | Montgomery | 4—10 X |
| 1,430,198 | 9/1922 | Stebler | 210—158 |
| 2,073,384 | 3/1937 | Barnebl | 210—402 X |
| 2,489,454 | 11/1949 | Henno | 210—160 X |
| 2,858,939 | 11/1958 | Korlis | 4—10 X |
| 2,916,145 | 12/1959 | Kaiser | 210—401 |
| 3,098,144 | 7/1963 | Dale | 4—131 |

SAMIH N. ZAHARNA, Primary Examiner

U.S. Cl. X.R.

210—158, 160, 161, 247

UNITED STATES PATENT OFFICE
CERTIFICATE OF CORRECTION

Patent No. 3,526,589                                            September 1, 1970

Floyd H. Meller et al.

It is certified that error appears in the above identified patent and that said Letters Patent are hereby corrected as shown below:

Column 2, line 41, "requirement" should read -- requirements --. Column 3, line 11, "watste" should read -- waste --. Column 11, lines 16 and 17, "from said liquid fractions," should read -- from said housing separately from liquid fractions, --.

Signed and sealed this 23rd day of March 1971.

(SEAL)
Attest:

EDWARD M. FLETCHER, JR.                            WILLIAM E. SCHUYLER, JR.
Attesting Officer                                          Commissioner of Patents